US012421794B2

(12) United States Patent
Huang et al.

(10) Patent No.: US 12,421,794 B2
(45) Date of Patent: Sep. 23, 2025

(54) CORD WINDING ASSEMBLY, ACTUATING SYSTEM AND WINDOW SHADE

(71) Applicant: Teh Yor Co., Ltd., New Taipei (TW)

(72) Inventors: Chien-Fong Huang, City of Industry, CA (US); Chin-Tien Huang, New Taipei (TW)

(73) Assignee: TEH YOR CO., LTD., New Taipei (TW)

( * ) Notice: Subject to any disclaimer, the term of this patent is extended or adjusted under 35 U.S.C. 154(b) by 217 days.

(21) Appl. No.: 17/709,220

(22) Filed: Mar. 30, 2022

(65) Prior Publication Data

US 2022/0316272 A1 Oct. 6, 2022

Related U.S. Application Data

(60) Provisional application No. 63/171,344, filed on Apr. 6, 2021.

(51) Int. Cl.
*E06B 9/322* (2006.01)
*E06B 9/72* (2006.01)

(52) U.S. Cl.
CPC ................ *E06B 9/322* (2013.01); *E06B 9/72* (2013.01)

(58) Field of Classification Search
CPC .... E06B 9/322; E06B 9/32; E06B 2009/2111; E06B 2009/3225; E06B 2009/2627; E06B 9/72
See application file for complete search history.

(56) References Cited

U.S. PATENT DOCUMENTS 6,588,480 B2 * 7/2003 Anderson ............... E06B 9/322 160/170
7,143,802 B2 * 12/2006 Strand ....................... E06B 9/60 160/167 R (Continued)

FOREIGN PATENT DOCUMENTS

CA 3074387 A1 * 9/2020 ............. E06B 9/322
CN 112211542 A † 1/2021

(Continued)

OTHER PUBLICATIONS

International Search Report in the parent PCT application No. PCT/US2022/022633, dated Jul. 25, 2022.

(Continued)

*Primary Examiner* — Abe Massad
*Assistant Examiner* — Matthew R. Shepherd
(74) *Attorney, Agent, or Firm* — Chen Yoshimura LLP

(57) ABSTRACT

A cord winding assembly for a window shade includes a housing, a first and a second spool portion respectively connected with a first and a second suspension cord, and a transmission axle. The first and second spool portions are disposed in a cavity of the housing. The transmission axle is rotationally coupled to the first and second spool portions and extends outside the housing at least at one end thereof, the transmission axle and the first and second spool portions being rotatable concurrently relative to the housing in a first direction for respectively winding the first and second suspension cords around the first and second spool portions, and in a second direction opposite to the first direction for respectively unwinding the first and second suspension cords from the first and second spool portions.

18 Claims, 11 Drawing Sheets

(56) References Cited

U.S. PATENT DOCUMENTS

| | | | | |
|---|---|---|---|---|
| 8,752,607 | B2 * | 6/2014 | Anderson | E06B 9/322 160/171 |
| 9,695,633 | B2 | 7/2017 | Morris et al. | |
| 10,871,029 | B2 * | 12/2020 | Ter Haar | E06B 9/325 |
| 10,954,716 | B2 † | 3/2021 | Anderson | |
| 11,525,300 | B1 * | 12/2022 | Huang | E06B 9/322 |
| 2002/0174961 | A1 * | 11/2002 | Anderson | E06B 9/322 160/178.1 R |
| 2004/0016517 | A1 * | 1/2004 | Anderson | E06B 9/322 160/173 R |
| 2007/0089838 | A1 * | 4/2007 | Wetsema | E06B 9/322 160/84.06 |
| 2007/0144686 | A1 | 6/2007 | Drew | |
| 2012/0267060 | A1 * | 10/2012 | Anderson | E06B 9/322 160/307 |
| 2015/0007946 | A1 * | 1/2015 | Yu | E06B 9/322 160/84.02 |
| 2016/0208551 | A1 * | 7/2016 | Huang | E06B 9/56 |
| 2016/0222724 | A1 * | 8/2016 | Morris | E06B 9/262 |
| 2017/0292321 | A1 | 10/2017 | Chen et al. | |
| 2017/0292322 | A1 | 10/2017 | Chen et al. | |
| 2019/0234140 | A1 * | 8/2019 | Valkenburg | E06B 9/262 |
| 2019/0343318 | A1 * | 11/2019 | Cheng | E06B 9/78 |
| 2020/0123849 | A1 | 4/2020 | Feder et al. | |
| 2020/0284090 | A1 | 9/2020 | Schulman et al. | |
| 2021/0017812 | A1 | 1/2021 | Cheng | |
| 2021/0172246 | A1 * | 6/2021 | Huang | E06B 9/262 |
| 2021/0230939 | A1 * | 7/2021 | Otsuka | E06B 9/262 |
| 2022/0065038 | A1 | 3/2022 | Liang | |
| 2022/0145698 | A1 * | 5/2022 | Hong | E06B 9/68 |

FOREIGN PATENT DOCUMENTS

| | | | | | |
|---|---|---|---|---|---|
| DE | 102009041699 | B3 | * | 1/2011 | E06B 9/262 |
| DE | 202021100704 | U1 | | 2/2021 | |
| EP | 1 052 365 | B1 | † | 12/2004 | |
| EP | 2305943 | A2 | * | 4/2011 | E06B 9/262 |
| JP | 2017-186886 | A | | 10/2017 | |
| JP | 2020-525673 | A | | 8/2020 | |
| TW | M502735 | U | | 6/2015 | |
| TW | I602531 | B | † | 10/2017 | |
| TW | 202104744 | A | | 2/2021 | |
| TW | M608822 | U | † | 3/2021 | |
| WO | WO-2014006624 | A1 | * | 1/2014 | E06B 9/262 |

OTHER PUBLICATIONS

Written Opinion in the parent PCT application No. PCT/US2022/022633, dated Jul. 25, 2022.

Taiwanese Office Action, dated Aug. 23, 2022, in a counterpart Taiwanese patent application, No. TW 111112479. (English translation of the search report is attached.).

Japanese Office Action, dated Oct. 8, 2024 in a counterpart Japanese patent application, No. JP 2023-551727.

* cited by examiner
† cited by third party

CORD WINDING ASSEMBLY, ACTUATING SYSTEM AND WINDOW SHADE

CROSS-REFERENCE TO RELATED APPLICATION(S)

This application claims priority to U.S. provisional patent application No. 63/171,344 filed on Apr. 6, 2021, the disclosure of which is hereby incorporated by reference.

BACKGROUND

1. Field of the Invention

The present invention relates to window shades, and cord winding assemblies and actuating systems used in window shades.

2. Description of the Related Art

Certain window shades available on the market may be provided with an electric motor that allows conveniently raising and lowering of the shade. The electric motor and its power source may be disposed in a head rail mounted at a top of a window frame. The electric motor may be coupled to multiple cord winding units, wherein each of the cord winding units has one suspension cord anchored to a bottom rail of the window shade.

The aforementioned arrangement is not compact, which may not be suitable for window shades of more complex constructions, such as window shades including two adjustable rails.

SUMMARY

The present application describes cord winding assemblies and actuating systems for window shades that are compact and easy to install, and can address at least the foregoing issues.

According to one aspect, a cord winding assembly for a window shade includes a housing, a first and a second spool portion respectively connected with a first and a second suspension cord, and a transmission axle. The housing has a first and a second end opposite to each other, and a cavity between the first and second ends. The first and second spool portions are disposed in the cavity of the housing. The transmission axle is rotationally coupled to the first and second spool portions and extends outside the housing at least at the first end thereof, the transmission axle and the first and second spool portions being rotatable concurrently relative to the housing in a first direction for respectively winding the first and second suspension cords around the first and second spool portions, and in a second direction opposite to the first direction for respectively unwinding the first and second suspension cords from the first and second spool portions.

According to another aspect, the present application describes actuating systems for a window shade. According to an embodiment, an actuating system for a window shade includes an electric motor unit and the cord winding assembly, the electric motor unit being coupled to the transmission axle of the cord winding assembly, whereby the electric motor unit is operable to drive the transmission axle in rotation. According to an embodiment, a window shade includes a head rail, a bottom rail, and the aforementioned actuating system assembled with the head rail, wherein the first and second suspension cords are anchored to the bottom rail.

According to another embodiment, an actuating system for a window shade includes an electric motor unit, and two ones of the cord winding assembly respectively disposed at two opposite sides of the electric motor unit, the electric motor unit being respectively coupled to the transmission axle of each of the two cord winding assemblies. According to an embodiment, a window shade includes a head rail, a bottom rail, an intermediate rail disposed between the head rail and the bottom rail, a shading structure disposed between the bottom rail and the intermediate rail, and the aforementioned actuating system assembled with the head rail, wherein the first and second suspension cords of one of the two cord winding assemblies are anchored to the bottom rail, and the first and second suspension cords of the other one of the two cord winding assemblies are anchored to the intermediate rail.

DETAILED DESCRIPTION OF THE EMBODIMENTS

Figure 1:
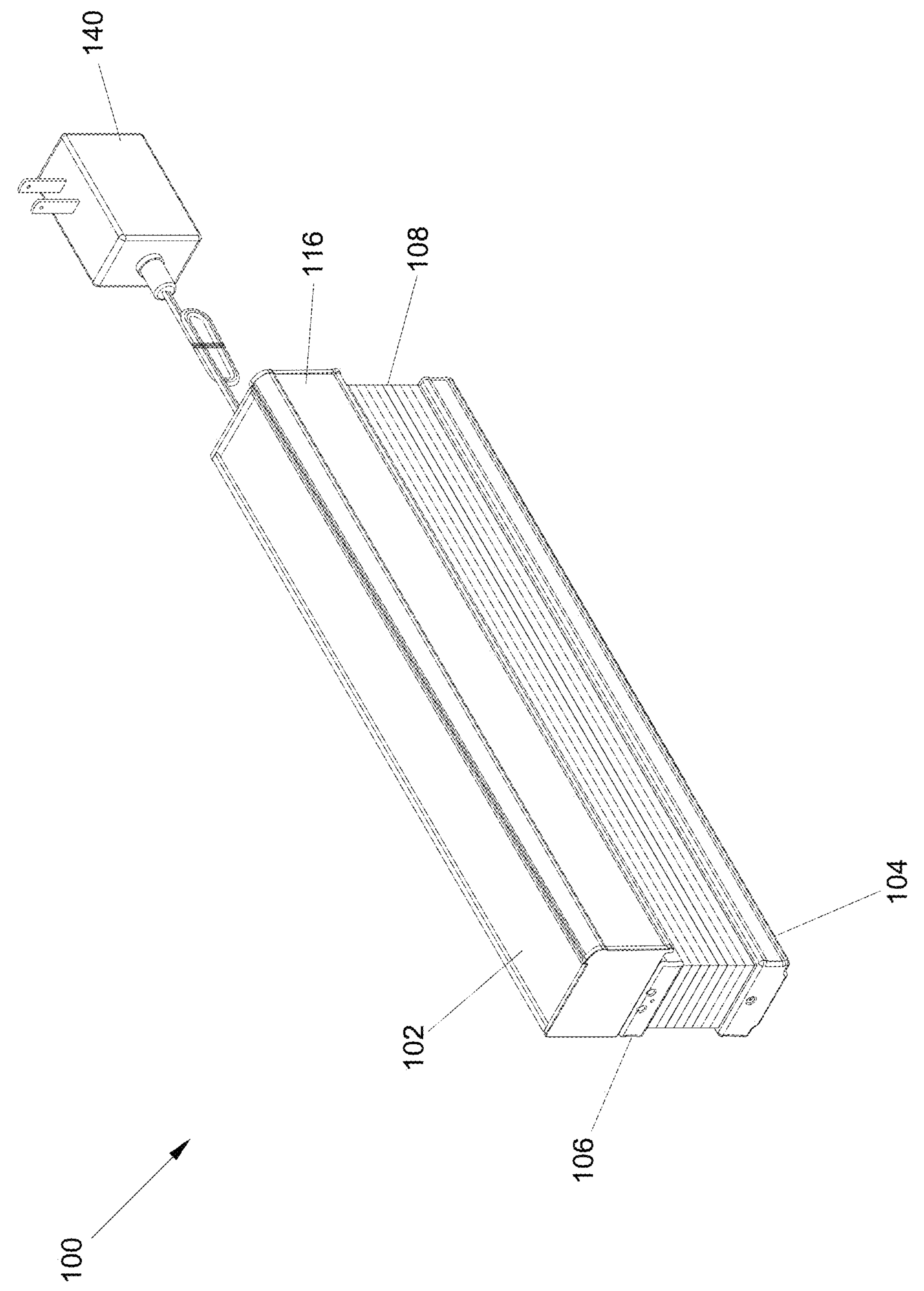
FIG. 1 is a perspective view illustrating an embodiment of a window shade.
Figure 2:
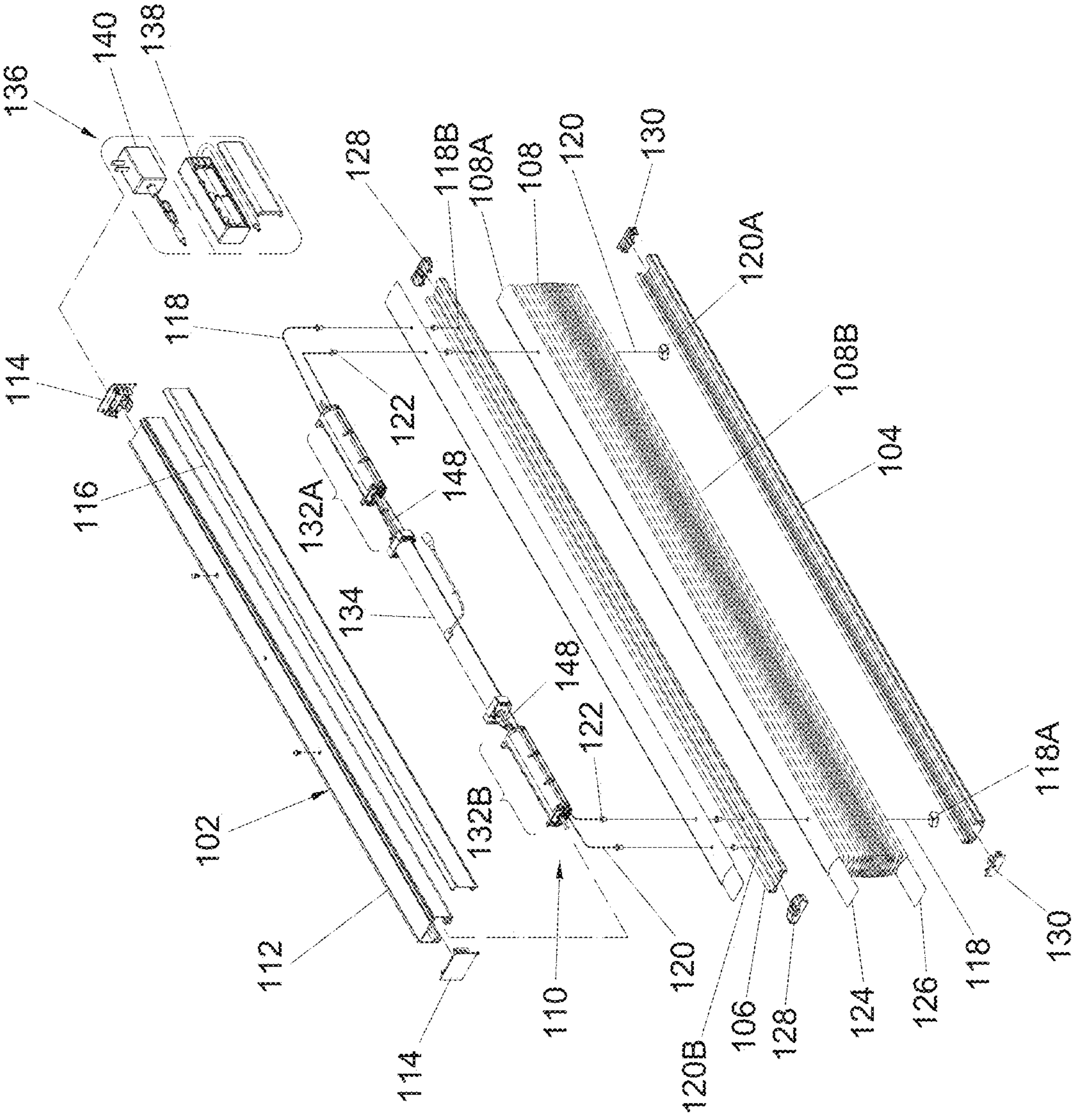
FIG. 2 is an exploded view of the window shade shown in FIG. 1.

FIG. 1 is a perspective view illustrating an embodiment of a window shade 100, and FIG. 2 is an exploded view of the window shade 100. Referring to FIGS. 1 and 2, the window shade 100 can include a head rail 102, a bottom rail 104, an intermediate rail 106 disposed between the head rail 102 and the bottom rail 104, a shading structure 108 disposed between the bottom rail 104 and the intermediate rail 106, and an actuating system 110.

The head rail 102 may be affixed at a top of a window frame, and can have any desirable shapes. According to an example of construction, the head rail 102 can have an elongate shape including a cavity for at least partially receiving the actuating system 110 of the window shade 100. For example, the head rail 102 can include a rail part 112 having an inner cavity that is respectively closed at two opposite ends with two end caps 114, and a cover 116 attached to a front of the rail part 112.

The bottom rail 104 can be suspended from the head rail 102 with at least two suspension cords 118 and 120, wherein the two suspension cords 118 and 120 can respectively have ends 118A and 120A anchored to the bottom rail 104. According to an example of construction, the bottom rail 104 may have a channel adapted to receive to the attachment of the shading structure 108.

The intermediate rail 106 can be disposed between the head rail 102 and the bottom part 104, and can be suspended from the head rail 102 with at least two other suspension cords 118 and 120, wherein the other two suspension cords 118 and 120 can respectively have ends 118B and 120B anchored to the intermediate rail 106. The intermediate rail 106 may also have an elongate shape having a channel adapted to receive an attachment of the shading structure 108. Moreover, a plurality of guiding elements 122 may be provided in the intermediate rail 106 for facilitating the passage of the suspension cords 118 and 120 that are anchored to the bottom rail 104 through the intermediate rail 106. The guiding elements 122 may exemplary include grommets affixed to the intermediate rail 106.

The shading structure 108 may exemplary have a cellular structure, which may include, without limitation, honeycomb structures. However, it will be appreciated that the shading structure 108 may have any suitable structure that can be expanded and collapsed between the bottom rail 104 and the intermediate rail 106. The shading structure 108 has two opposite ends 108A and 108B respectively disposed adjacent to the intermediate rail 106 and the bottom rail 104. For example, the end 108A of the shading structure 108 may be provided with a strip 124 that is engaged with the intermediate rail 106 so as to attach the end 108A of the shading structure 108 to the intermediate rail 106, and the other end 108B of the shading structure 108 may be likewise attached to the bottom rail 104 via a strip 126. Two end caps 128 may respectively close two opposite ends of the intermediate rail 106 so as to restrain the strip 124 inside the intermediate rail 106, and two end caps 130 may respectively close two opposite ends of the bottom rail 104 so as to retrain the strip 126 inside the bottom rail 104.

Referring to FIGS. 1 and 2, each of the bottom rail 104 and the intermediate rail 106 is independently movable vertically relative to the head rail 102 for setting the window shade 100 to a desirable configuration. For example, the bottom rail 104 may be lowered away from the head rail 102 and the intermediate rail 106 to expand the shading structure 108, or raised toward the head rail 102 and the intermediate rail 106 to collapse the shading structure 108. Moreover, the bottom rail 104 and the intermediate rail 106 may be lowered away from the head rail 102 to form a gap for light passage between the head rail 102 and the intermediate rail 106. The vertical position of the bottom rail 104 and the vertical position of the intermediate rail 106 relative to the head rail 102 may be controlled with the actuating system 110.

Referring to FIGS. 1 and 2, the actuating system 110 is assembled with the head rail 102, and is operable to displace the bottom rail 104 and the intermediate rail 106 relative to the head rail 102 for adjustment. The actuating system 110 can include two cord winding assemblies 132A and 132B, an electric motor unit 134 and a power supply 136. The cord winding assembly 132A is operable to wind and unwind the two suspension cords 118 and 120 that are coupled to the bottom rail 104 for raising and lowering the bottom rail 104. The cord winding assembly 132B is operable to wind and unwind the other two suspension cords 118 and 120 that are coupled to the intermediate rail 106 for raising and lowering the intermediate rail 106.

The electric motor unit 134 is coupled to each of the two cord winding assemblies 132A and 132B, and can be electrically connected with the power supply 136. The electric motor unit 134 is operable to independently drive each of the two cord winding assemblies 132A and 132B. For example, the electric motor unit 134 may include two motors respectively coupled to the two cord winding assemblies 132A and 132B, each of the two motors being independently operable to drive the corresponding one of the two cord winding assemblies 132A and 132B. The power supply 136 can be electrically connected with the electric motor unit 134, and can provide electric power for operating the electric motor unit 134. According to an example of construction, the power supply 136 may include a battery casing 138 and a power adapter 140. The battery casing 138 is adapted to receive one or more battery cells, and can be electrically connected with or disconnected from the electric motor unit 134. The power adapter 140 can be plugged to an electric outlet, and can be electrically connected with or disconnected from the electric motor unit 134. The electric motor unit 134 can be powered with battery cells of the battery casing 138, or via the power adapter 140 connected with an electric outlet.

Figure 3:
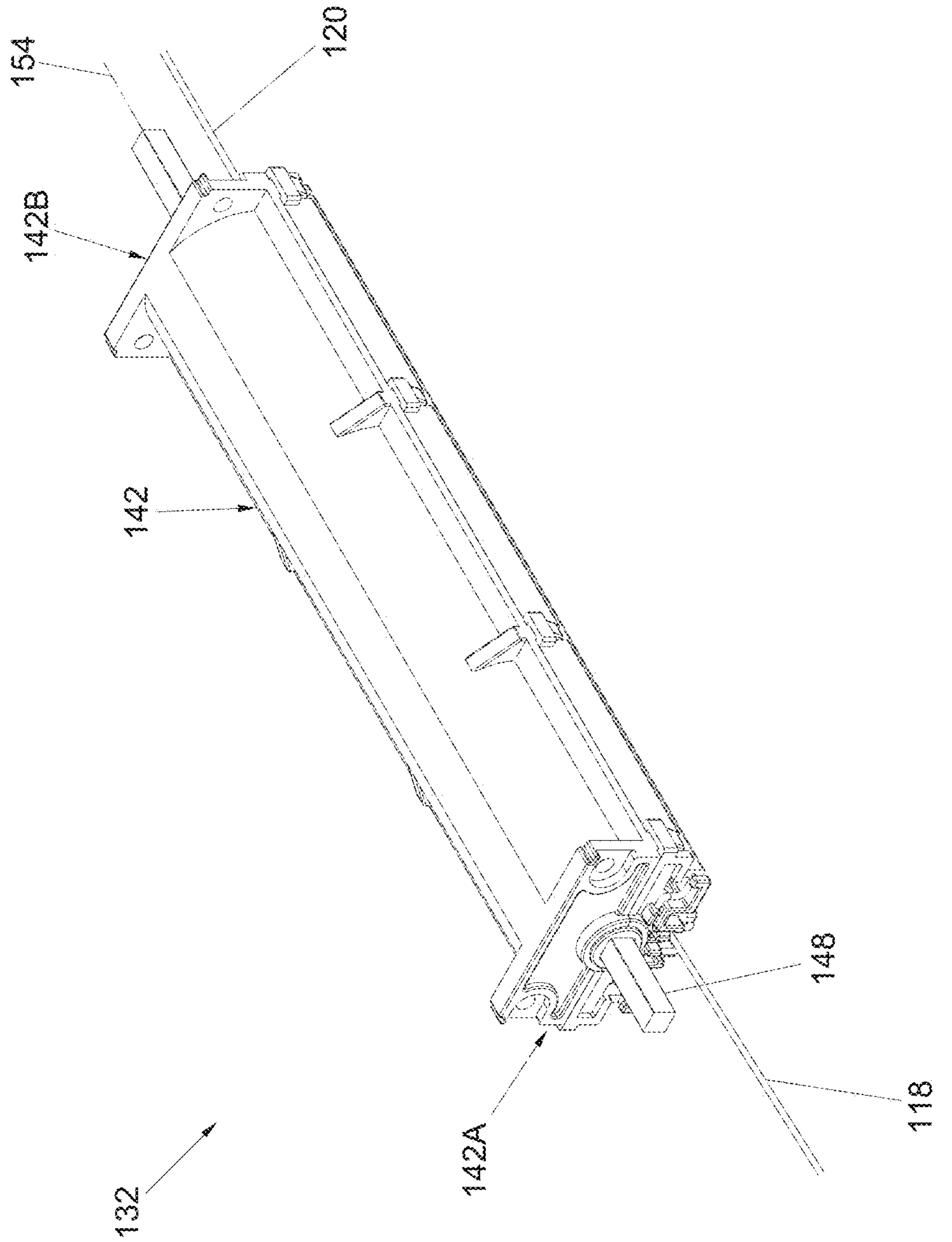
FIG. 3 is a perspective view illustrating a cord winding assembly for a window shade.
Figure 4:
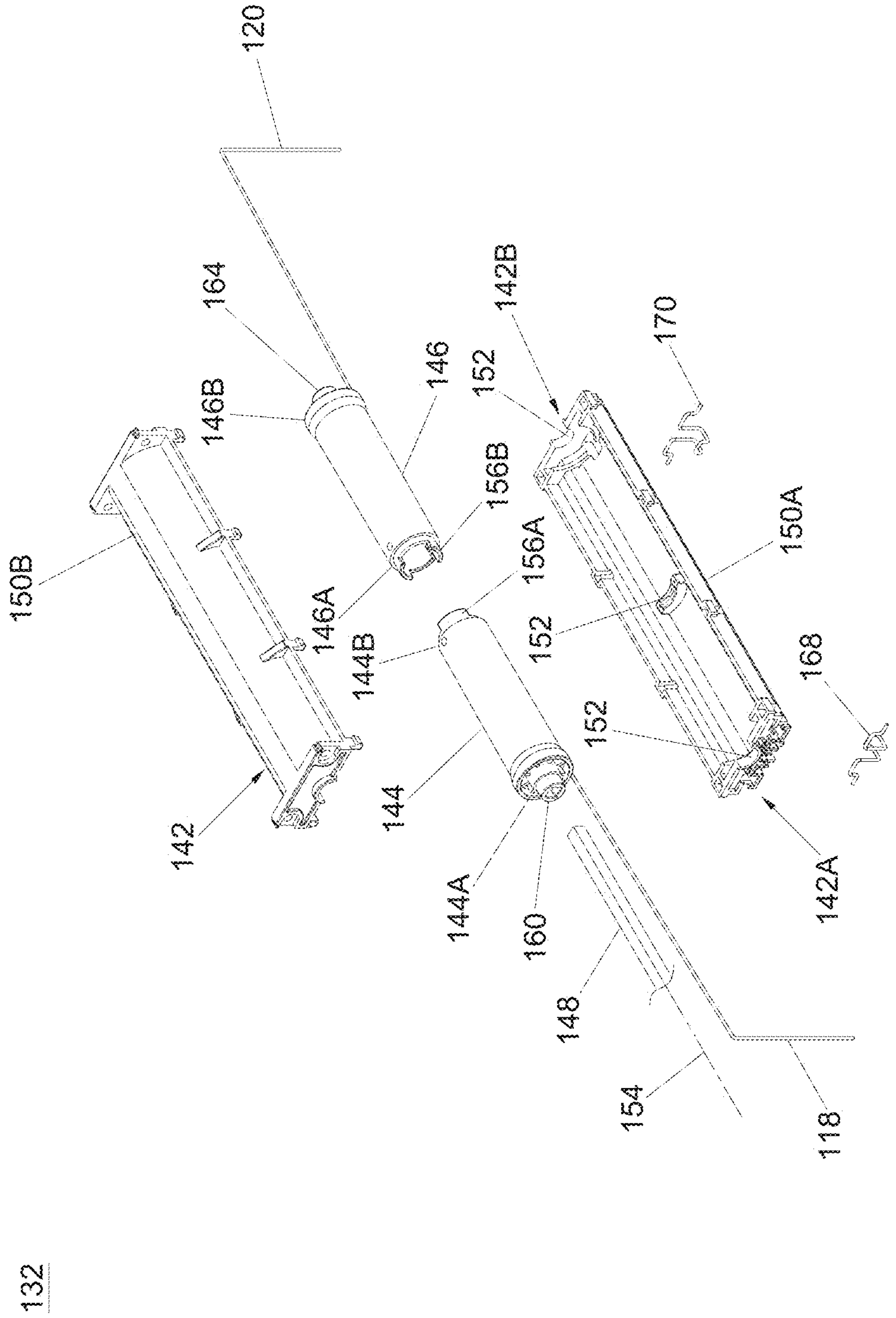
FIG. 4 is an exploded view illustrating some construction details of the cord winding assembly shown in FIG. 3.

Referring to FIG. 2, the two cord winding assemblies 132A and 132B can be respectively disposed at two opposite sides of the electric motor unit 134. In conjunction with FIG. 2, FIG. 3 is a perspective view illustrating a cord winding assembly 132 for a window shade, and FIG. 4 is an exploded view illustrating some construction details of the cord winding assembly 132. Referring to FIGS. 2-4, each of the two cord winding assemblies 132A and 132B can have a same construction as the cord winding assembly 132 shown in FIGS. 3 and 4. The cord winding assembly 132 can include a housing 142, a spool portion 144 connected with the suspension cord 118, a spool portion 146 connected with the suspension cord 120, and a transmission axle 148 rotationally coupled to the two spool portions 144 and 146.

Figure 5:
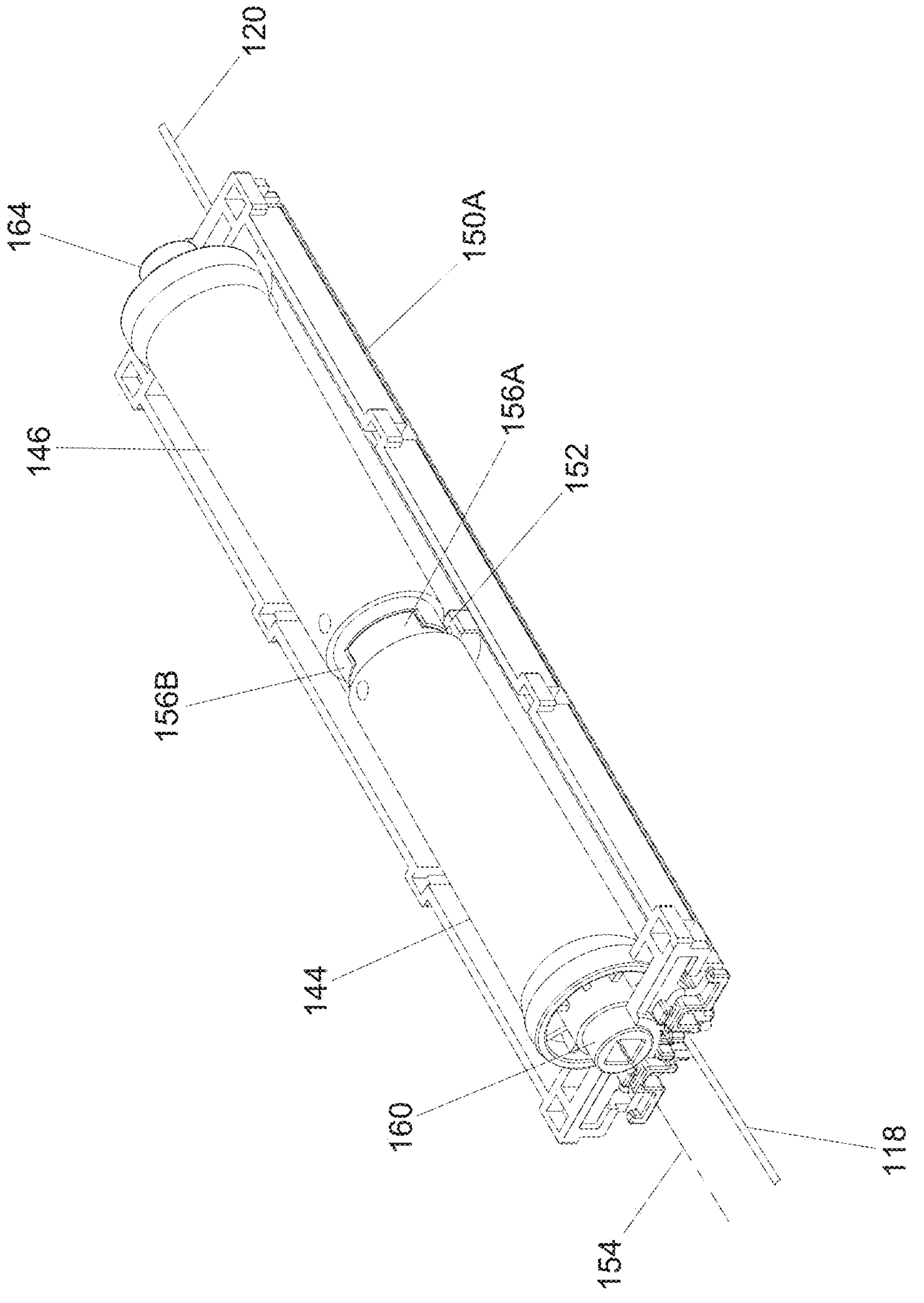
FIG. 5 is a perspective view illustrating the arrangement of two spool portions in a casing portion of the cord winding assembly shown in FIG. 3.

The housing 142 can include two casing portions 150A and 150B that can be fixedly connected with each other to at least partially define a cavity that is located between two opposite ends 142A and 142B of the housing 142 and is adapted to receive the two spool portions 144 and 146. The housing 142 can include a plurality of mount surfaces 152 on which the two spool portions 144 and 146 can be supported for rotation about a pivot axis 154 relative to the housing 142. FIG. 5 is a perspective view illustrating the two spool portions 144 and 146 disposed on the mount surfaces 152 provided in the casing portion 150A.

According to an example of construction, the two spool portions 144 and 146 can be provided as two separate parts that can be disposed adjacent to each other inside the housing 142. For example, the spool portion 144 can have two axially opposite spool ends 144A and 144B with the spool end 144B having a flange structure 156A, the spool portion 146 can have two axially opposite spool ends 146A and 146B with the spool end 146A having a flange structure 156B, and the two spool portions 144 and 146 can be disposed inside the housing 142 with the two flange structures 156A and 156B engaged with each other so that the two spool portions 144 and 146 are rotationally locked to each other for concurrent rotation about the pivot axis 154. The aforementioned construction may facilitate the assembly of the two spool portions 144 and 146. However, it will be appreciated that the two spool portions may also be formed integrally as a single part.

Figure 6:
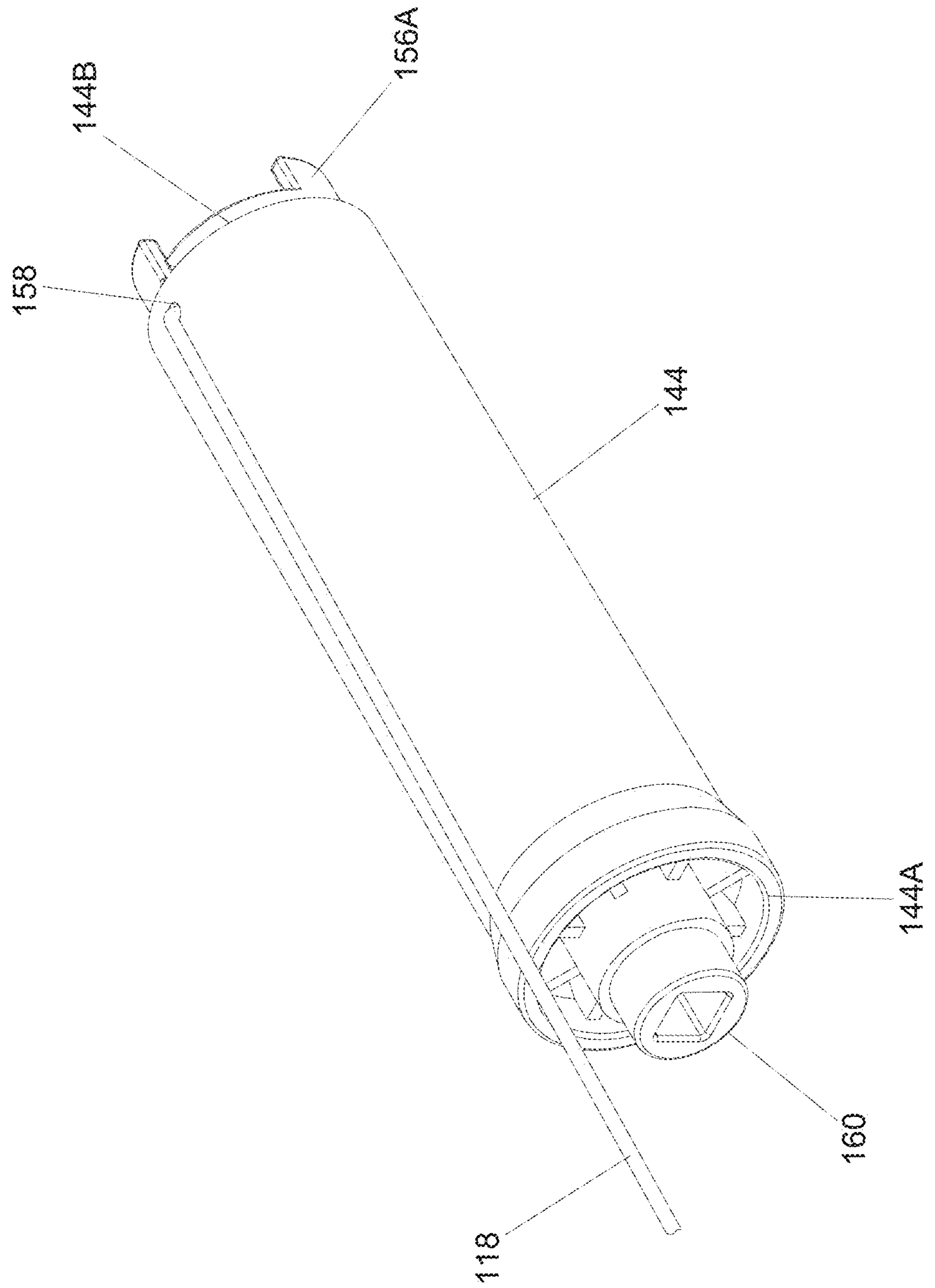
FIG. 6 is a perspective view illustrating the connection of one spool portion with a suspension cord in the cord winding assembly of FIG. 3.

The suspension cord 118 can be anchored to the spool portion 144 adjacent to the spool end 144B thereof, and the suspension cord 120 can be anchored to the spool portion 146 adjacent to the spool end 146A thereof. As shown in FIG. 6, an outer surface of the spool portion 144 can have an opening 158 adjacent to the spool end 144B, and the suspension cord 118 can be anchored to the spool portion 144 by having an end of the suspension cord 118 attached through the opening 158. The suspension cord 120 can be anchored to the spool portion 146 in a similar way. The suspension cord 118 may be arranged to extend outside the housing 142 at the end 142A thereof, and the suspension cord 120 may be arranged to extend outside the housing 142 at the opposite end 142B thereof.

The transmission axle 148 is rotationally coupled to the two spool portions 144 and 146 so that the transmission axle 148 and the two spool portions 144 and 146 are rotatable concurrently about the same pivot axis 154 relative to the housing 142, the pivot axis 154 corresponding to a lengthwise axis of the transmission axle 148. For example, the spool end 144A of the spool portion 144 can have a coupling portion 160 provided with a square or rectangular hole connected with a hollow interior of the spool portion 144, and the spool end 146B of the spool portion 146 can have a coupling portion 164 likewise provided with a square or rectangular hole connected with a hollow interior of the spool portion 146. The transmission axle 148 can have a cross-sectional shape that matches with that of the holes provided in the coupling portions 160 and 164. The transmission axle 148 can be disposed through the hollow interior of the spool portion 144 and the hollow interior of the spool portion 146, and can be rotationally coupled to the two spool portions 144 and 146 respectively through the two coupling portions 160 and 164 thereof. After assembly, the transmission axle 148 can extend through the two spool ends 144A and 144B of the spool portion 144 and through the two spool ends 146A and 146B of the spool portion 146, and can protrude outside the housing 142 at the two opposite ends 142A and 142B thereof. The transmission axle 148 and the two spool portions 144 and 146 can rotate concurrently about the pivot axis 154 relative to the housing 142 in a first direction for respectively winding the two suspension cords 118 and 120 around the two spool portions 144 and 146, and in a second direction opposite to the first direction for respectively unwinding the two suspension cords 118 and 120 from the two spool portions 144 and 146.

Figure 7:
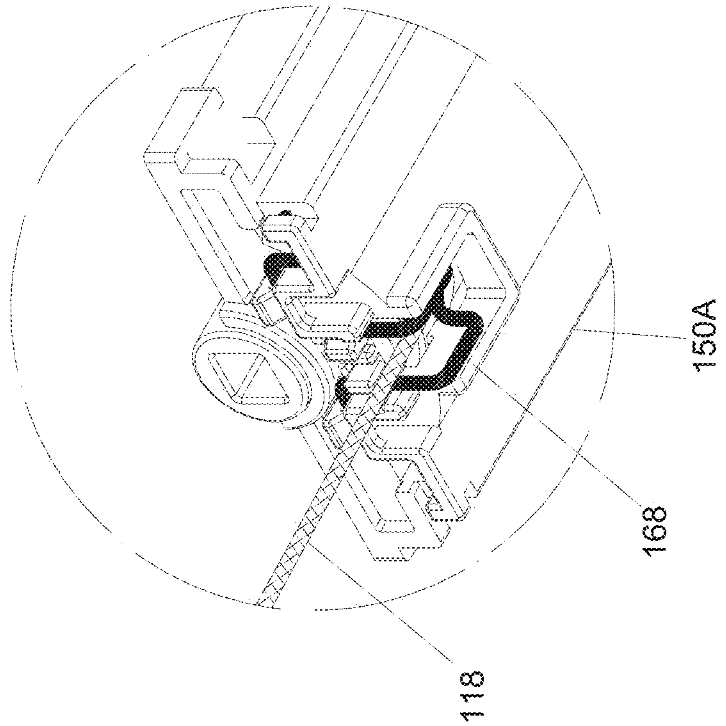
FIG. 7 is an enlarged view illustrating some construction details provided at an underside of the cord winding assembly shown in FIG. 3.

Referring to FIGS. 4 and 7, the cord winding assembly 132 can further include two cord guards 168 and 170 respectively affixed to the housing 142 adjacent to the two ends 142A and 142B thereof. The cord guard 168 can contact with the suspension cord 118 at a location where the suspension cord 118 exits the housing 142, and the cord guard 170 can contact with the suspension cord 120 at a location where the suspension cord 120 exits the housing 142. The two cord guards 168 and 170 can provide protection and facilitate the passage of the two suspension cords 118 and 120.

Referring to FIGS. 2-7, each of the two cord winding assemblies 132A and 132B can have the same construction as the cord winding assembly 132, and the electric motor unit 134 can be respectively coupled to the transmission axle 148 of the cord winding assembly 132A and the transmission axle 148 of the cord winding assembly 132B at two opposite sides. The electric motor unit 134 is thereby operable to drive the transmission axle 148 of each of the cord winding assemblies 132A and 132B in rotation for moving the bottom rail 104 and the intermediate rail 106 as desired. After assembly, one of the two suspension cords 118 and 120 of the cord winding assembly 132A can extend along the head rail 102 past the electric motor unit 134 and the cord winding assembly 132B so that the two suspension cords 118 and 120 of the cord winding assembly 132A can respectively extend at the two opposite sides of the electric motor unit 134 for coupling to the bottom rail 104. The two suspension cords 118 and 120 of the cord winding assembly 132B can be likewise arranged for coupling to the intermediate rail 106.

Figure 8:
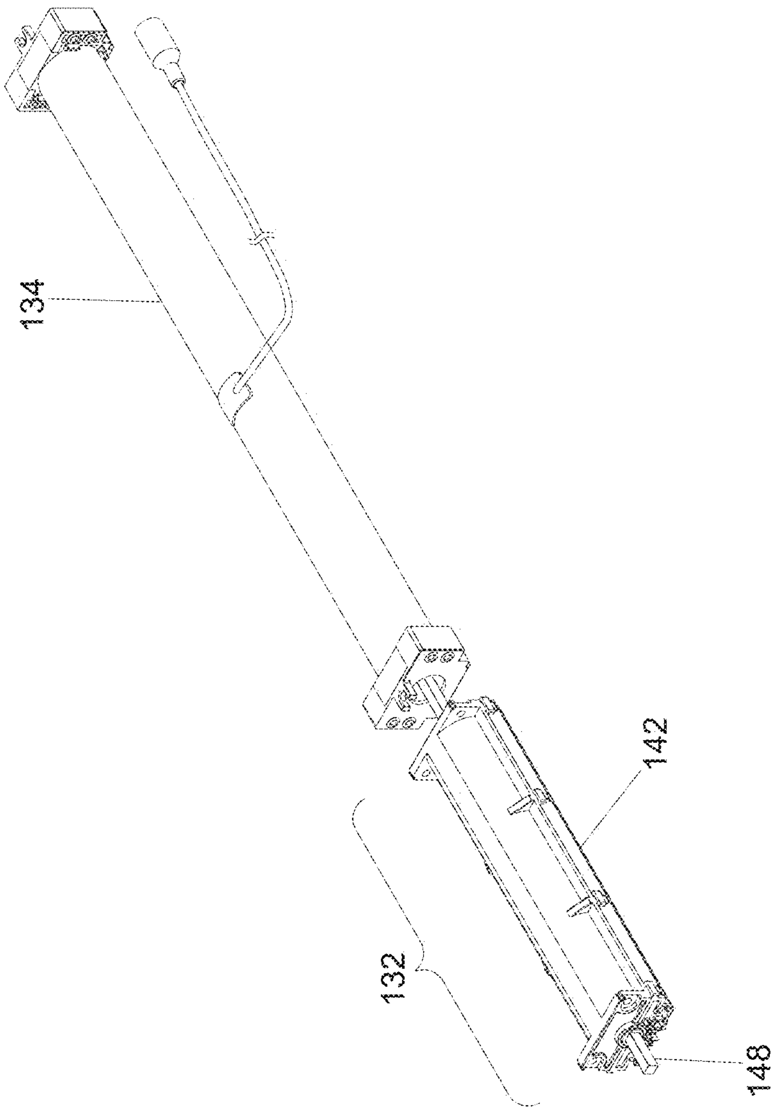
FIG. 8 is a perspective view illustrating a variant example of an actuating system including an electric motor unit coupled to a single cord winding assembly.

Although FIGS. 1 and 2 illustrate an example having two cord winding assemblies 132A and 132B respectively coupled to the bottom rail 104 and the intermediate rail 106, it will be understood that the construction of the cord winding assembly 132 is not limited to the illustrated example of application. FIG. 8 is a perspective view illustrating a variant example of an actuating system in which the electric motor unit 134 may be coupled to one single cord winding assembly 132, which may be coupled to a bottom rail of a window shade having no intermediate rail. Accordingly, the cord winding assembly 132 may be suitable for use in various window shades.

Figure 9:
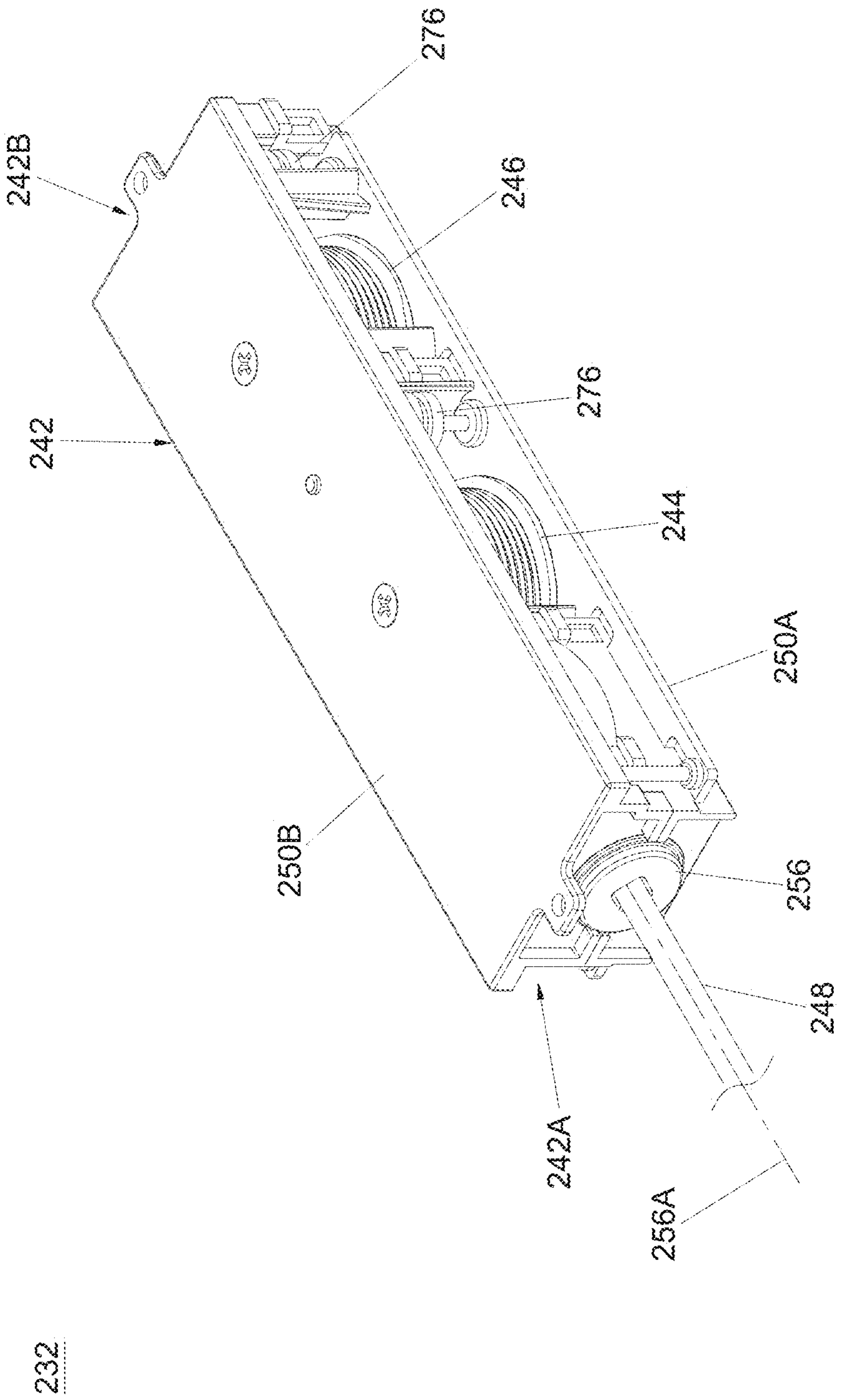
FIG. 9 is a perspective view illustrating a variant construction of a cord winding assembly for a window shade.
Figure 10:
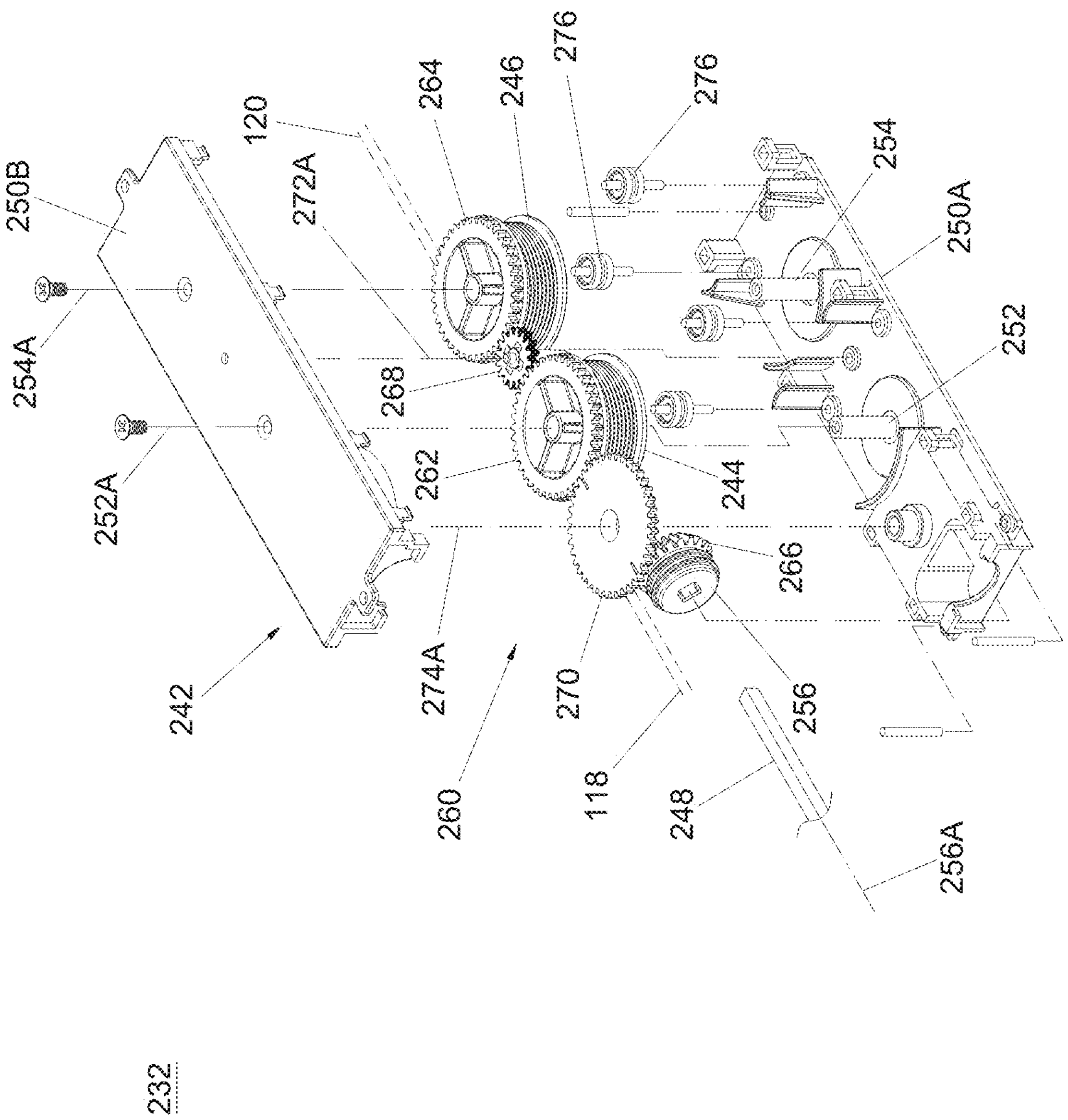
FIG. 10 is an exploded view illustrating some construction details of the cord winding assembly shown in FIG. 9.

FIG. 9 is a perspective view illustrating a variant construction of a cord winding assembly 232 for a window shade, and FIG. 10 is an exploded view of the cord winding assembly 232. Referring to FIGS. 9 and 10, the cord winding assembly 232 can include a housing 242, a spool portion 244 connected with the suspension cord 118 (shown with phantom lines in FIG. 10), a spool portion 246 connected with the suspension cord 120 (shown with phantom lines in FIG. 10), and a transmission axle 248 rotationally coupled to the two spool portions 244 and 246.

The housing 242 can include two casing portions 250A and 250B that can be fixedly connected with each other to at least partially define a cavity that is located between two opposite ends 242A and 242B of the housing 242 and is adapted to receive the two spool portions 244 and 246.

The spool portion 244 can be pivotally connected with the housing 242 about a pivot shaft 252 so that the spool portion 244 is rotatable about a pivot axis 252A relative to the housing 242. The spool portion 246 can be pivotally connected with the housing 242 about a pivot shaft 254 so that the spool portion 246 is rotatable about a pivot axis 254A relative to the housing 242, the pivot axes 252A and 254A being parallel and spaced apart from each other. The transmission axle 248 is disposed so as to be rotatable relative to the housing 242 about a pivot axis 256A that is substantially orthogonal to the pivot axes 252A and 254A, the pivot axis 256A corresponding to a lengthwise axis of the transmission axle 248. For example, the transmission axle 248 can have an end connected with a coupling part 256 that is assembled with the housing 242 for rotation about the pivot axis 256A. The coupling part 256 can be disposed adjacent to the end 242A of the housing 242, and can exemplarily have a square or rectangular hole through which the end of the transmission axle 248 is engaged for rotationally coupling the transmission axle 248 to the coupling part 256. After assembly, the transmission axle 248 can extend outside the housing 242 at the end 242A thereof. The suspension cord 118 connected with the spool portion 244 may be arranged to extend outside the housing 242 at the end 242A thereof, and the suspension cord 120 connected with the spool portion 246 may be arranged to extend outside the housing 242 at the opposite end 242B thereof.

Referring to FIGS. 9 and 10, the transmission axle 248 is rotationally coupled to the two spool portions 244 and 246 via a gear train 260, which can include a plurality of gears 262, 264, 266, 268 and 270. The gear 262 is rotationally locked to the spool portion 244 so that the gear 262 and the spool portion 244 are rotatable concurrently about the pivot axis 252A relative to the housing 242. The gear 264 is rotationally locked to the spool portion 246 so that the gear 264 and the spool portion 246 are rotatable concurrently about the pivot axis 254A relative to the housing 242. The gear 266 is fixedly connected with the coupling part 256, and thereby is rotationally locked to the transmission axle 248 so that the gear 266 and the transmission axle 248 are rotatable concurrently about the pivot axis 256A relative to the housing 242. According to an example of construction, the gear 266 can be a bevel gear. The gear 268 is pivotally connected with the housing 242 about a pivot axis 272A, and is respectively meshed with the gears 262 and 264. The gear 270 is pivotally connected with the housing 242 about a pivot axis 274A, and is respectively meshed with the gears 262 and 266. The gear train 260 is configured so that the two spool portions 244 and 246 can be driven by the transmission axle 248 to concurrently rotate in one direction (e.g., one of a clockwise direction and an anti-clockwise direction) for respectively winding the suspension cords 118 and 120, and in another opposite direction (e.g., the other one of the clockwise direction and the anti-clockwise direction) for respectively unwinding the suspension cords 118 and 120. Accordingly, the transmission axle 248 and the two spool portions 244 and 246 can rotate concurrently relative to the housing 242 for respectively winding and unwinding the two suspension cords 118 and 120.

Referring to FIGS. 9 and 10, the housing 242 can further be provided with a plurality of cord guides 276 for guiding the passage of the suspension cords 118 and 120 through the housing 242. Examples of the cord guides 276 may include, without limitation, pulleys.

Figure 11:
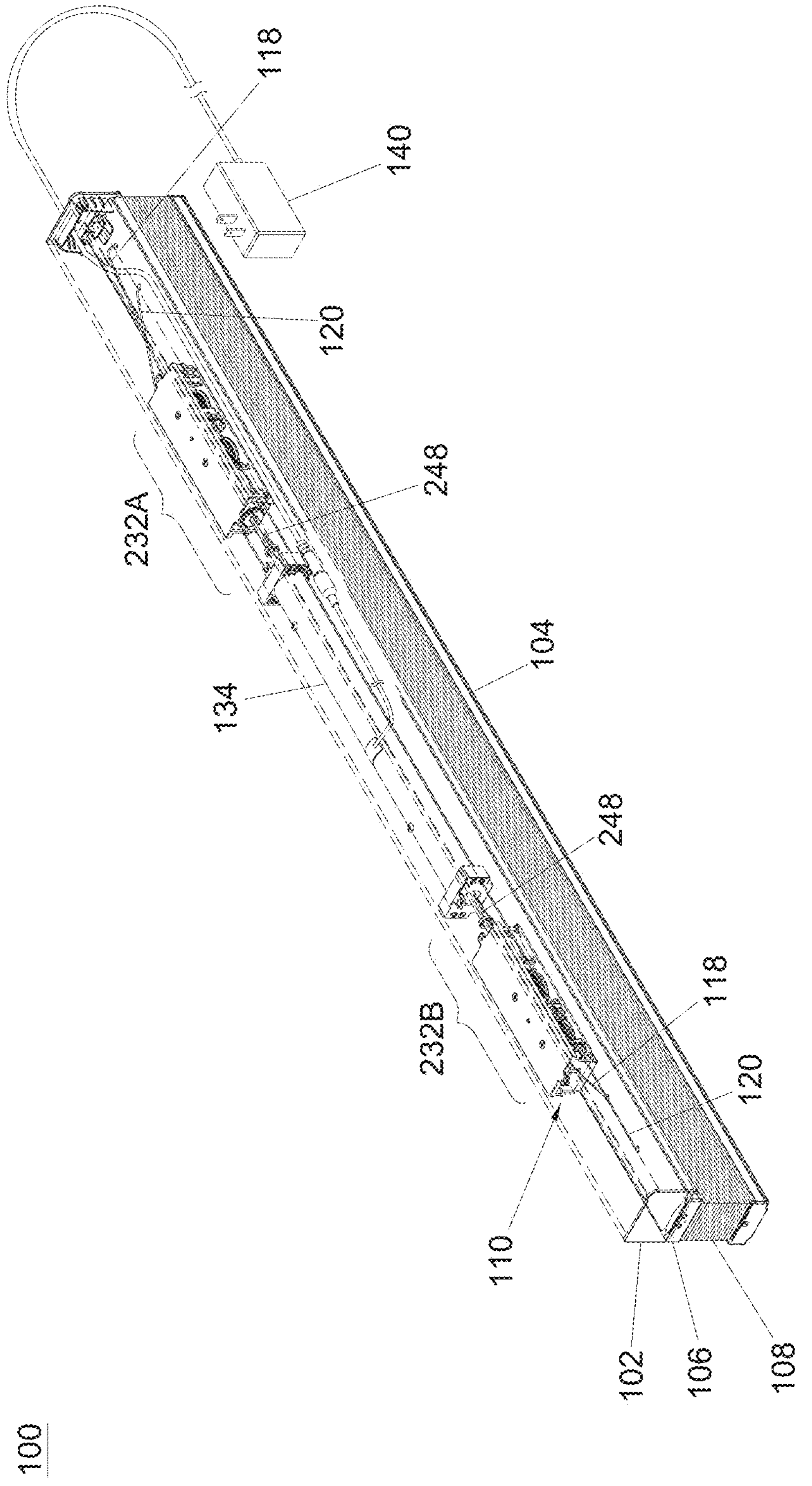
FIG. 11 is a perspective view illustrating a window shade including the cord winding assembly of FIG. 9.

In conjunction with FIGS. 9 and 10, FIG. 11 is a perspective view illustrating a window shade 100 using two cord winding assemblies 232A and 232B that have the same construction as the cord winding assembly 232 described previously. Referring to FIGS. 9-11, the actuating system 110 is assembled with the head rail 102, and is operable to displace the bottom rail 104 and the intermediate rail 106 relative to the head rail 102. The actuating system 110 shown in FIG. 11 can be generally similar in construction to the previous embodiment illustrated in FIG. 2, except that the two cord winding assemblies 132A and 132B are replaced with the two cord winding assemblies 232A and 232B. Each of the two cord winding assemblies 232A and 232B has the same construction as the cord winding assembly 232 described previously with reference to FIGS. 9 and 10, wherein the two suspension cords 118 and 120 of the cord winding assembly 232A can be coupled to the bottom rail 104 and the two suspension cords 118 and 120 of the cord winding assembly 232B can be coupled to the intermediate rail 106. The electric motor unit 134 can be respectively coupled to the transmission axle 248 of the cord winding assembly 232A and the transmission axle 248 of the cord winding assembly 232B at two opposite sides. The electric motor unit 134 is thereby operable to drive the transmission axle 248 of each of the cord winding assemblies 232A and 232B in rotation for moving the bottom rail 104 and the intermediate rail 106 as desired.

Advantages of the structures described herein include the ability to provide cord winding assemblies that are compact, and can be used as modules easy to install in an actuating system of a window shade.

Realizations of the structures have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the claims that follow.

What is claimed is:

1. A cord winding assembly for a window shade, comprising:

a housing having a first and a second end opposite to each other along a lengthwise axis of the housing, and a cavity between the first and the second ends, the housing being configured to be installed in a rail of the window shade;

a first spool portion connected with a first suspension cord, and a second spool portion connected with a second suspension cord, the first and the second spool portions being disposed in the cavity of the housing, the first suspension cord extending inside the housing from the first spool portion to the first end of the housing and exiting the housing at the first end thereof, the second suspension cord extending inside the housing from the second spool portion to the second end of the housing and exiting the housing at the second end thereof; and a transmission axle rotationally coupled to the first and the second spool portions and extending outside the housing at least at the first end thereof, the transmission axle and the first and the second spool portions being rotatable concurrently relative to the housing in a first direction for respectively winding the first and the second suspension cords around the first and the second spool portions, and in a second direction opposite to the first direction for respectively unwinding the first and the second suspension cords from the first and the second spool portions;

wherein the first spool portion and the second spool portion are two individual parts, the first spool portion has a first and a second spool end axially opposite to each other and the second spool portion has a third and a fourth spool end axially opposite to each other, the transmission axle is disposed through a hollow interior of the first spool portion and a hollow interior of the second spool portion, the transmission axle being rotationally engaged with the first spool end of the first spool portion and rotationally engaged with the fourth spool end of the second spool portion, the second spool end of the first spool portion being adjacent to the third spool end of the second spool portion, the second spool end of the first spool portion having a first flange structure and the third spool end of the second spool portion having a second flange structure engaged with the first flange structure; and wherein the first suspension cord has a first cord end anchored to the first spool portion adjacent to the first flange structure, and the second suspension cord has a second cord end anchored to the second spool portion adjacent to the second flange structure.

2. The cord winding assembly according to claim 1, wherein the transmission axle, the first spool portion and the second spool portion are rotatable about a same pivot axis relative to the housing.

3. The cord winding assembly according to claim 1, wherein the transmission axle protrudes outside the housing at the first and the second ends thereof.

4. The cord winding assembly according to claim 1, wherein the transmission axle extends through the first and the second spool ends of the first spool portion and through the third and the fourth spool ends of the second spool portion.

5. The cord winding assembly according to claim 1, wherein the transmission axle extends outside the housing at the first end and the second end thereof, the first suspension cord winds from the first cord end thereof along a longitudinal axis of the transmission axle in a direction away from the second spool portion, the second suspension cord winds from the second cord end thereof along the longitudinal axis in a direction away from the first spool portion, the first suspension cord exiting the housing at a location adjacent to where the transmission axle exits the first end of the housing, and the second suspension cord exiting the housing at a location adjacent to where the transmission axle exits the second end of the housing.

6. An actuating system comprising an electric motor unit, and two instances of the cord winding assembly according to claim 1 being respectively disposed at two opposite sides of the electric motor unit, the electric motor unit being respectively coupled to the transmission axle of each of the two instances of the cord winding assembly.

7. A window shade comprising:

a head rail, a bottom rail, an intermediate rail disposed between the head rail and the bottom rail, and a shading structure disposed between the bottom rail and the intermediate rail; and the actuating system according to claim 6 assembled with the head rail, wherein the first and the second suspension cords of one of the two instances of the cord winding assembly are anchored to the bottom rail, and the first and the second suspension cords of another one of the two instances of the cord winding assembly are anchored to the intermediate rail.

8. An actuating system comprising:

an electric motor unit; and a first and a second cord winding assembly, wherein each of the first and the second cord winding assemblies includes:

a housing having a first and a second end opposite to each other, and a cavity between the first and the second ends, the housing being installable in a rail of a window shade;

a first spool portion connected with a first suspension cord, and a second spool portion connected with a second suspension cord, the first and the second spool portions being two individual parts disposed in the cavity of the housing; and a transmission axle rotationally coupled to the first and the second spool portions and extending outside the housing at the first end and the second end thereof, the transmission axle and the first and the second spool portions being rotatable concurrently relative to the housing in a first direction for respectively winding the first and the second suspension cords around the first and the second spool portions, and in a second direction opposite to the first direction for respectively unwinding the first and the second suspension cords from the first and the second spool portions, wherein the first suspension cord has a first cord end anchored to the first spool portion and winds from the first cord end along a longitudinal axis of the transmission axle in a direction away from the second spool portion, the second suspension cord has a second cord end anchored to the second spool portion and winds from the second cord end along the longitudinal axis in a direction away from the first spool portion, the first suspension cord exiting the housing at a location adjacent to where the transmission axle exits the first end of the housing, and the second suspension cord exiting the housing at a location adjacent to where the transmission axle exits the second end of the housing;

wherein the first and the second cord winding assemblies are respectively disposed at two opposite sides of the electric motor unit, the electric motor unit being coupled to the transmission axle of each of the first and the second cord winding assemblies in a region between the first and the second cord winding assemblies, the electric motor unit being operable to independently drive the transmission axle of each of the first and the second cord winding assemblies in rotation; and wherein the first suspension cord and the second suspension cord of each of the first and the second cord winding assemblies are configured to exit the rail at two opposite rail ends thereof, the first cord winding assembly having one of the first suspension cord and the second suspension cord thereof configured to extend inside the rail along the second cord winding assembly to a first one of the two rail ends, and the second cord winding assembly having one of the first suspension cord and the second suspension cord thereof configured to extend inside the rail along the first cord winding assembly to a second one of the two rail ends.

9. The actuating system according to claim 8, wherein in at least one of the first and the second cord winding assemblies, the first spool portion has a first and a second spool end axially opposite to each other and the second spool portion has a third and a fourth spool end axially opposite to each other, the transmission axle being rotationally engaged with the first spool end of the first spool portion and rotationally engaged with the fourth spool end of the second spool portion, the second spool end of the first spool portion being adjacent to the third spool end of the second spool portion.

10. The actuating system according to claim 9, wherein in the at least one of the first and the second cord winding assemblies, the second spool end of the first spool portion has a first flange structure and the third spool end of the second spool portion has a second flange structure engaged with the first flange structure, the first suspension cord having a first cord end anchored to the first spool portion adjacent to the first flange structure, and the second suspension cord having a second cord end anchored to the second spool portion adjacent to the second flange structure.

11. The actuating system according to claim 9, wherein in the at least one of the first and the second cord winding assemblies, the second spool end of the first spool portion is engaged with the third spool end of the second spool portion to rotationally lock the first spool portion to the second spool portion.

12. The actuating system according to claim 9, wherein in the at least one of the first and the second cord winding assemblies, the first suspension cord has a first cord end anchored to the first spool portion adjacent to the second spool end thereof, and the second suspension cord has a second cord end anchored to the second spool portion adjacent to the third spool end thereof.

13. A window shade comprising:

a head rail, a bottom rail, an intermediate rail disposed between the head rail and the bottom rail, and a shading structure disposed between the bottom rail and the intermediate rail; and the actuating system according to claim 8 assembled with the head rail, wherein the first and the second suspension cords of one of the first and the second cord winding assemblies are anchored to the bottom rail, and the first and the second suspension cords of the other another one of the first and the second cord winding assemblies are anchored to the intermediate rail.

14. An actuating system for a window shade, comprising:

a first and a second cord winding assembly, wherein each of the first and the second cord winding assemblies includes:

a housing having a first and a second end opposite to each other, and a cavity between the first and second ends, the housing being installable in a rail of a window shade;

a first spool portion connected with a first suspension cord, and a second spool portion connected with a second suspension cord, the first and second spool portions being disposed in the cavity of the housing; and a transmission axle rotationally coupled to the first and second spool portions and extending outside the housing at the first end and the second end thereof, the transmission axle and the first and second spool portions being rotatable concurrently relative to the housing in a first direction for respectively winding the first and second suspension cords around the first and second spool portions, and in a second direction opposite to the first direction for respectively unwinding the first and second suspension cords from the first and second spool portions;

wherein the first spool portion and the second spool portion are two individual parts, the first spool portion has a first and a second spool end opposite to each other and the second spool portion has a third and a fourth spool end opposite to each other, the second spool end of the first spool portion being rotationally locked to the third spool end of the second spool portion, the transmission axle being rotationally engaged with the first spool end of the first spool portion and rotationally engaged with the fourth spool end of the second spool portion, the first suspension cord has a first cord end anchored to the first spool portion and winds from the first cord end along a longitudinal axis of the transmission axle in a direction away from the second spool portion, the second suspension cord has a second cord end anchored to the second spool portion and winds from the second cord end along the longitudinal axis in a direction away from the first spool portion, the first suspension cord exiting the housing at a location adjacent to where the transmission axle exits the first end of the housing, and the second suspension cord exiting the housing at a location adjacent to where the transmission axle exits the second end of the housing; and wherein the first suspension cord and the second suspension cord of each of the first and the second cord winding assemblies are configured to exit the rail at two opposite rail ends thereof, the first cord winding assembly having one of the first suspension cord and the second suspension cord thereof configured to extend inside the rail along the second cord winding assembly to a first one of the two rail ends, and the second cord winding assembly having one of the first suspension cord and the second suspension cord thereof configured to extend inside the rail along the first cord winding assembly to a second one of the two rail ends.

15. The actuating system according to claim 14, wherein in at least one of the first and the second cord winding assemblies, the second spool end of the first spool portion has a first flange structure, the third spool end of the second spool portion has a second flange structure engaged with the first flange structure to rotationally lock the first spool portion to the second spool portion, and the transmission axle extends through the first and second spool ends of the first spool portion and through the third and fourth spool ends of the second spool portion.

16. The actuating system according to claim 15, wherein in the at least one of the first and the second cord winding assemblies, the first spool portion has a first opening adjacent to the first flange structure, the second spool portion has a second opening adjacent to the second flange structure, the first cord end of the first suspension cord being anchored to the first spool portion at the first opening, and the second cord end of the second suspension cord being anchored to the second spool portion at the second opening.

17. The actuating system according to claim 14, wherein in at least one of the first and the second cord winding assemblies, the first cord end of the first suspension cord is anchored to the first spool portion adjacent to the second spool end thereof, and the second cord end of the second suspension cord is anchored to the second spool portion adjacent to the third spool end thereof.

18. An actuating system comprising two instances of the cord winding assembly according to claim 1, wherein the first suspension cord and the second suspension cord of each of the two instances of the cord winding assembly are configured to exit the rail at two opposite rail ends thereof, a first one of the two instances of the cord winding assembly having one of the first suspension cord and the second suspension cord thereof configured to extend inside the rail along a second one of the two instances of the cord winding assembly to a first one of the two rail ends, and the second one of the two instances of the cord winding assembly having one of the first suspension cord and the second suspension cord thereof configured to extend inside the rail along the first one of the two instances of the cord winding assembly to a second one of the two rail ends.

* * * * *